Figure 4:
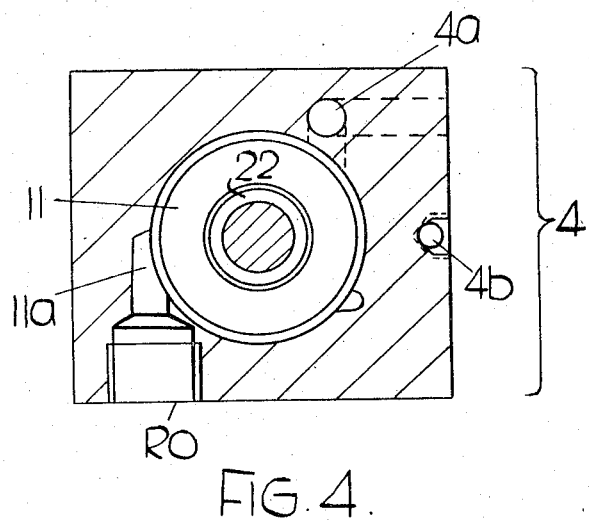

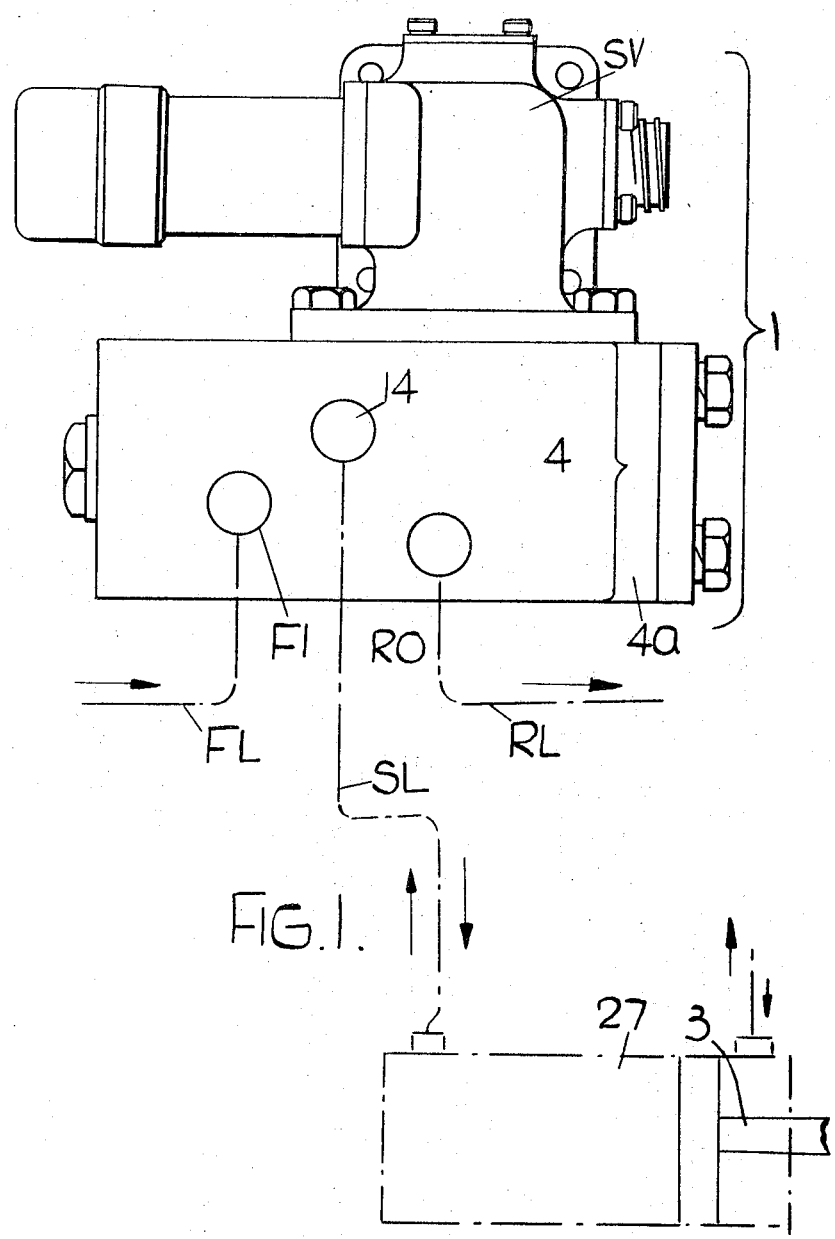

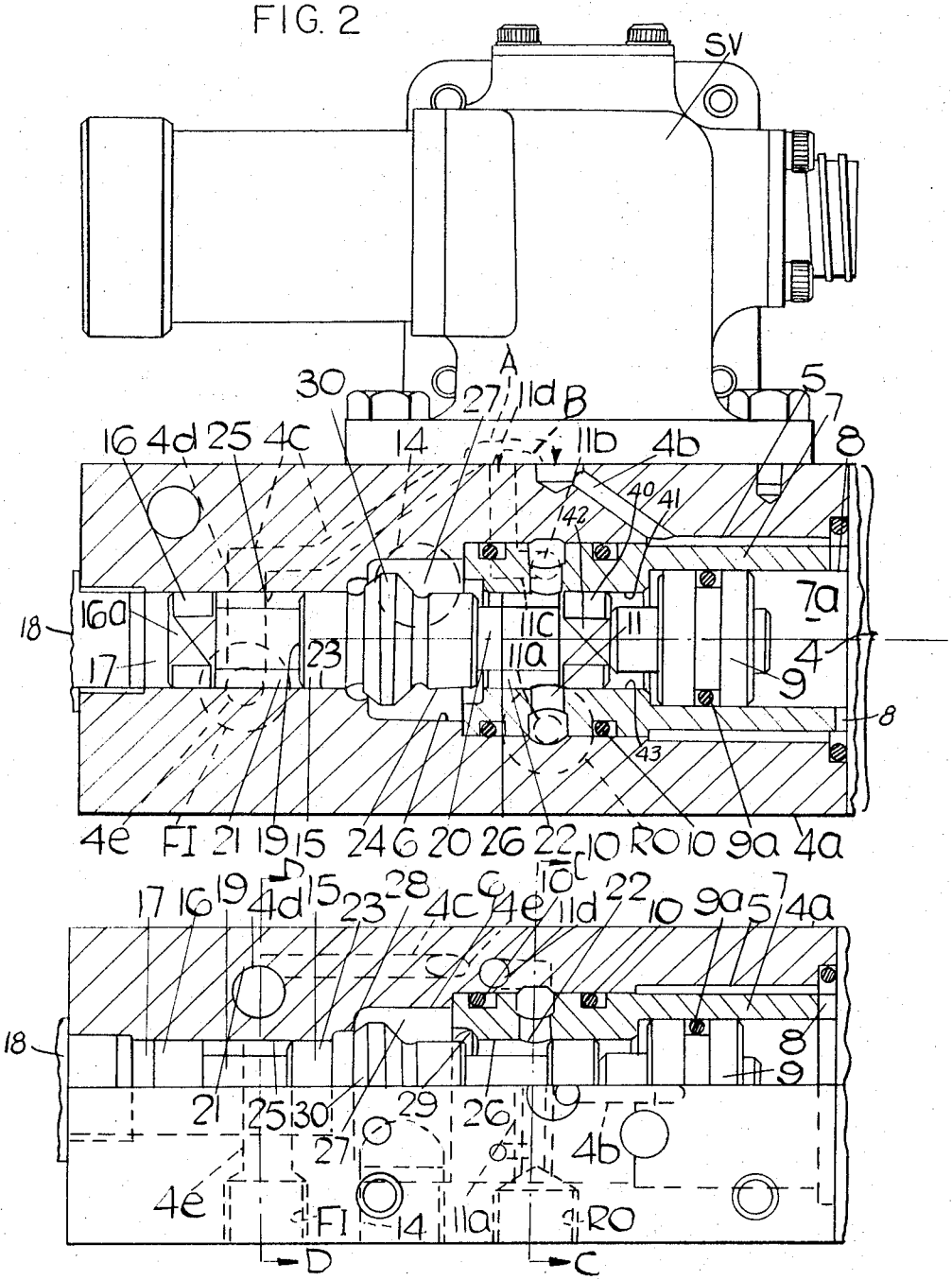

United States Patent Office 3,318,331
Patented May 9, 1967

3,318,331
CONTROL VALVE FOR HIGH PRESSURE
HYDRAULIC CYLINDERS AND THE
LIKE
Frank Town, Burton Joyce, England, assignor to
W. E. & F., Dobson, Limited
Filed Jan. 14, 1965, Ser. No. 425,401
Claims priority, application Great Britain, Jan. 18, 1964,
2,313/64
3 Claims. (Cl. 137—625.63)

This invention is for improvements in or relating to electro-hydraulic control means of mine roof supports primarily of the type comprising hydraulic props interconnected by a horizontal advancing cylinder and ram.

It has been heretofore proposed for the necessary control to be obtained through the medium of a pilot fluid valve in a pilot fluid line for controlling the usual main fluid control valve in the main fluid line, and for the pilot fluid valve to be in turn controlled by a solenoid operated fluid valve.

An object of the invention is to provide for control by a solenoid without the necessity for the fluid valve it operates to be in a pilot fluid line.

The invention provides electro-hydraulic control means of mine roof supports in which a hydraulic cylinder and ram is controlled by operation of a fluid control valve which in turn is controlled by a solenoid operated fluid valve, characterised by the fluid control valve being connected in the main fluid line and embodying slide valve faces which are displaceable between two positions for alternatively opening the feed or return to the required service, and valve seating faces for fluid sealing purposes when the slide valve faces are in either of the two positions. Conveniently for controlling an advancing cylinder and ram which inter-connects two hydraulic props, the solenoid operated fluid valve is of normally open type to normally cause setting of the fluid control valve with the feed closed and the return open to the required service, so that upon operation of the solenoid, fluid is directed by the solenoid valve to operate the fluid control valve thereby to open the feed and close the return to the required service.

Conveniently also for controlling a hydraulic prop, the solenoid operated fluid valve is of normally closed type to normally cause setting of the fluid control valve with the feed open and the return closed to the required service for extension of the prop, so that upon operation of the solenoid, fluid is thereby directed by the solenoid valve to operate the fluid control valve whereby the feed is closed and the return is open to the required service thereby allowing contraction of the prop. The return pressure in this instance may be applied to the prop in prop-contracting manner so that the contraction of the prop is effected by the return pressure of fluid.

In each instance the fluid control valve may comprise a valve body having spaced feed and return connections, and an intermediate service connection to the service required, and in a valve passage transverse to these connections there is a valve member of sliding type having spaced parallel valve surfaces to co-operate with spaced parallel valve surfaces of said passage and also having an intermediate double-sided valve head for alternatively seating on spaced valve seats.

For operation of the valve member of the fluid control valve by the solenoid operated fluid valve, the valve member has different sized pistons at opposite ends, the small piston being in a chamber open to the feed connection and the large piston being in a chamber open to the solenoid operated fluid valve.

When applied to control a hydraulic prop, the large piston chamber may be connected to the annulus between the ram and the cylinder of the prop for effecting contraction of the prop.

Figure 5:
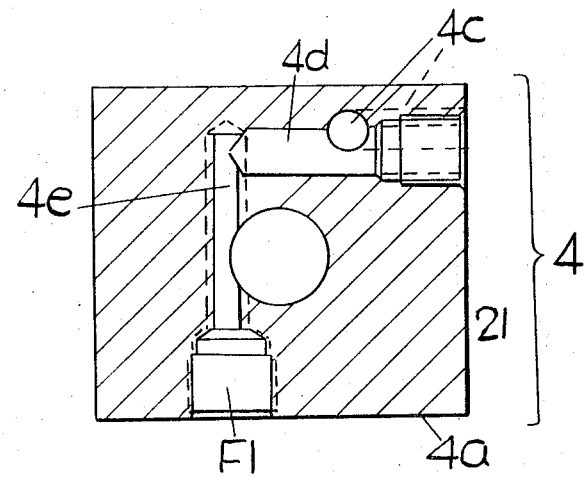

The above and other features of the invention set out in the appended claims are incorporated in the construction which will now be described, as a specific embodiment with reference to the accompanying drawings in which:

FIGURE 1 is a general view of electro-hydraulic valve control means according to the invention.
FIGURE 2 is a part section of the valve control means.
FIGURE 3 is a plan view partly in section of the valve control means.
FIGURE 4 is an end sectional view of the valve control means on line C—C of FIGURE 3.
FIGURE 5 is an end sectional view of the valve control means on line D—D of FIGURE 3.

The valve control means 1, see particularly FIGURE 1, is for controlling a horizontal advancing cylinder and ram 2, 3 which inter-connects two hydraulic props in well known manner.

There will be two of the valve control means 1, one associated with each end of the horizontal cylinder and ram for effecting the usual push-pull action thereof.

Each valve control means comprises a solenoid operated fluid valve SV mounted on a valve body 4a of a fluid control valve 4.

The solenoid operated fluid valve SV may be of any suitable normally open type of normally coupling (indicated by the arrow A) an inclined duct 4b, FIGURE 2, in the valve body 4a, via feed ducts 4c, 4d, 4e (also FIGURE 3), to the feed inlet FI connected to a feed line FL, FIGURE 1, from the main supply. When operated the solenoid operated fluid valve SV closes (at A) for uncoupling the duct 4b from the duct 4c.

This duct 4b communicates with a bore 5, FIGURE 2, in the valve body 4.

In one part of this bore 5 there is a bearing sleeve 7 having end ducts 8 for communication between the bore 5 and a chamber 7a in the sleeve 7.

In the chamber 7a there is a large diameter piston 9 with sealing ring 9a bearing against the interior of the sleeve 7. The sleeve 7 is provided with spaced sealing rings 10 at opposite sides of passages 11 which are in communication via a duct 11a (FIGURE 3) and a return outlet RO with a return line RL, FIGURE 1, to the main supply. The passages 11 also communicate via return ducts 11b, 11c, 11d with the solenoid valve SV such that the closing operation of the solenoid valve couples the duct 11d to the duct 4b (as indicated by the arrow B, FIGURE 2).

At a location between the feed inlet FI and the return outlet RO, FIGURE 1, there is a service outlet 14 connected by service line SL to the hydraulic device to be controlled.

Disposed in a valve passage 6, FIGURE 2, which is formed partly in the valve body 2 and partly in the sleeve 7, there is a slide valve spool member 15 for the large diameter piston 9 at one end, and at the other end a smaller diameter piston 16 in a small diameter chamber 17 which is blanked off by a plug 18.

The valve spool member 15 has reduced diameter portions 19, 20 to provide an annular passage 21 communicating via duct 4e (FIGURE 5) with the feed inlet FI and an annular passage 22, FIGURE 4, communicating with the return outlet RO through the passages 11 and 11a.

In between these two reduced portions 19, 20 of the valve member 15, the latter is formed with spaced parallel valve faces 23, 24 FIGURE 2 for co-operating respectively with spaced parallel valve faces 25, 26 of parts of the valve passage 6 in the valve body 2 and the sleeve 7.

In the region of the service outlet 14 the valve passage 6 provides a chamber 27 communicating with the service outlet 14 and, in this chamber 27, the valve body 2 and the sleeve 7 provide spaced valve seats 28, 29 with which there co-operates a double-sided valve head 30 on the valve member 15 between the parallel valve faces 23, 24.

The annular passage 21 is maintained in communication with the end chamber 17 by suitable flats 16a on the small diameter piston 16.

In use of the device for operation of the horizontal cylinder and ram in one direction (a similar device being provided for operation in the opposite direction), the solenoid operated fluid valve SV, being of the normally open type, normally opens the chamber 7a through the ducts 8, the bore 5, the inclined duct 4b, the means at A and the ducts 4c, 4d, 4e, to the feed inlet FI from the main supply, so that fluid pressure acts on the large diameter piston 9. By virtue of this piston being of larger diameter than that of the piston 16, the valve member 15 is disposed in the position shown in FIGURE 1 in which the return outlet RO communicates, through the duct 11a, the passage 11, and the chamber 27, with the service outlet 14, and the feed inlet FI is cut off from the service outlet 14 by the parallel valve surfaces 23, 25. A cylindrical guide 40 on the valve spool 15 engages the cylindrical wall 41 of the sleeve 7 for guiding during movement. Flats 42 on the cylindrical guide permit fluid to enter and escape from the chamber 43 on the left hand side of the piston head. In addition, sealing is effected by the double sided valve head 30 being urged against the seating 28, so that the fluid from the main supply is sealed from passing from the feed inlet FI to the service outlet 14, and fluid from the service can pass through the return outlet.

Upon closing operation of the solenoid operated fluid valve 1, this cuts off the duct 4b from the feed duct 4c but it also couples the duct 4b to the return duct 11d. Therefore the chamber 7a is then coupled, through the passages 8, the bore 5, the inclined duct 4b, the ducts 11d, 11c, 11a, the passages 11, and the duct 11a, to the return outlet RO. The result is that pressure fluid, acting through the feed inlet FI, the annular passage 21 enters the chamber 25 and flows across the flats 16a on the small diameter piston head 16. Thus, the high pressure fluid may enter the chamber 17 and act against the small diameter piston head 16 to displace the valve member 15 slidably along the valve passage 6 to an alternative position in which the parallel surface 23 moves away from the parallel surface 25 so that the feed inlet FI is then open, through the annular passage 21 and the chamber 27, to the service connection 14.

The movement of the valve member 15 also results in the parallel surface 24 registering with the parallel surface 26 thereby to cut off the service connection 14 from the return outlet RO. In addition, sealing is effected by the double sided valve head 30 being urged against the seating 29, so that fluid is sealed from passing from the service connection to the return outlet RO.

In the instance of employing this valve 4 for operating a hydraulic prop, the chamber 7a may be connected to the annulus between the prop's cylinder and ram. The solenoid operated fluid valve SV is of normally closed type so that normally the valve member 15 is in the position opening the feed inlet FI to the service connection 14, which in this instance is to the prop's pressure cylinder so that normally the prop is in extended condition. When however the solenoid operated fluid valve SV is operated, the feed outlet FI is cut off from the service connection 14, and the return outlet RO is open to the service connection 14, to allow contraction of the prop. Then the return pressure from the chamber 7a acts in the annulus between the prop's cylinder and ram to effect the lowering movement of the ram.

It will be understood that by virtue of the sealing characteristics of the fluid control valve, it can be employed directly in the main fluid supply line thereby avoiding the requirement of a pilot fluid valve in a pilot fluid line.

What I claim is:

1. A control valve particularly adapted to control high pressure hydraulic cylinders and the like, said control valve comprising a valve body having a longitudinal bore, one end of said longitudinal bore being of increased diameter relative to the other end and forming an enlarged piston receiving chamber, a first cylindrical sealing surface disposed intermediate said piston receiving chamber and said opposite end, a service chamber disposed in said longitudinal bore adjacent said first cylindrical sealing surface, an axially facing first valve seat in said service chamber disposed adjacent said first cylindrical sealing surface, a service outlet communicating with said service chamber and adapted for connection to said high pressure hydraulic cylinder, a second cylindrical sealing surface formed in said longitudinal bore adjacent said service chamber, a second axially facing valve seat being disposed intermediate said second cylindrical sealing surface and said service chamber in axial opposition to said first valve seat, a fluid supply inlet communicating with said longitudinal bore intermediate said service chamber and said other end, said fluid inlet also communicating with a first feed duct formed in said valve body, said first feed duct adapted for selective communication with a second feed duct, said second feed duct communicating with said end portion of said bore of increased diameter to permit application of high pressure into said end portion, a third duct and return outlet port communicating with said longitudinal bore intermediate a third cylindrical sealing surface formed in said portion of increased diameter, a valve spindle having an enlarged piston portion at one end slidably positioned in said longitudinal bore and having said enlarged piston portion disposed in said enlarged piston receiving chamber, sealing means on said enlarged piston portion engaging said third cylindrical sealing surface to isolate one end of said piston receiving chamber from the other end whereby said valve spindle will shift in response to pressure acting on said enlarged piston portion, a first cylindrical sealing portion on said valve spindle adapted for movement into and out of engagement with said first cylindrical sealing surface to thereby control flow between said service chamber and said return outlet port, a second cylindrical sealing portion on said valve spindle adapted for movement into and out of engagement with said second cylindrical sealing surface during movement of said valve spindle towards said opposite end, and an enlarged valve head on said spindle disposed in said service chamber and having axially facing seating portions on opposite sides thereof for sealing engagement with said first and second axially facing valve seats in response to longitudinal movement of said valve spindle.

2. The control valve of claim 1 where the end of said valve spindle adjacent said second cylindrical sealing surface includes means to permit fluid communication with the end of said valve spindle to thereby shift said valve surface on said valve spindle into said first cylindrical sealing surface.

3. The control valve of claim 1 wherein the end of said longitudinal bore of increased diameter is lined with a bearing sleeve forming said enlarged piston receiving chamber.

References Cited by the Examiner

UNITED STATES PATENTS

| | | | |
|---|---|---|---|
| 2,601,531 | 6/1952 | Kimmell | 137—625.63 |
| 2,859,735 | 11/1958 | Di Tirro et al. | 137—625.64 X |
| 2,916,051 | 12/1959 | Taylor | 137—625.64 |
| 2,940,475 | 6/1960 | Hicks | 91—465 |
| 2,952,246 | 9/1960 | Colling | 137—625.64 |
| 3,219,060 | 11/1965 | Pearl et al. | 137—625.6 |

FOREIGN PATENTS 615,008  6/1961  Italy.

M. CARY NELSON, *Primary Examiner.*

MARTIN P. SCHWADRON, *Examiner.*